Patented Mar. 11, 1930

1,749,812

UNITED STATES PATENT OFFICE

PAUL GRUBE, OF BRESLAU, GERMANY

PROCESS FOR PULVERIZING MOUNTAIN-ASH BERRIES

No Drawing. Application filed April 26, 1928, Serial No. 273,145, and in Germany April 16, 1927.

The berries of the mountain-ash contain substances of great healing power, which have been frequently used for curing inflammation-diseases of any kind and other infectious diseases.

These berries have however, up to the present, not been generally used, as it is impossible to bring the same into a lasting state, to be dosed readily, easy to take and digestible.

The attempts to dry the berries and then to crush the same have given a negative result, as the berries oppose a quite extraordinary resistance to the crushing by grinding as, although dried, they contain apparently a pappy constituent which at the grinding has a smearing effect.

One has further tried to submit the berries to strong cooling, eventually below the freezing point, and to pulverize the same subsequently. This process has also not given a satisfactory result although a powder is obtained, as this powder bakes rapidly together when stored at normal temperature, so that it forms a solid cake.

According to the invention, for which I have filed an application in Germany on the 16th of April, 1927, a lasting comparatively fine powder can be obtained in the following manner:

The berries are preliminarily dried in the air on hurdles, and then crushed in a crushing-machine so that the cellular vessels of the berries are torn and destroyed. This crushing to comparatively coarse pieces, which may be considered as a kind of rasping, is merely a preliminary treatment.

The preliminarily treated berries are exposed for a longer time, on drying hurdles, to a temperature of 70 to 80° C. and then rapidly cooled artificially to a temperature of a little above 0°. The cooled berries are then ground in a mill which, prior to the charging, has been exposed to very strong artificial cooling to a temperature near the freezing point. The mill and the grinding material must be maintained during the whole grinding process at a temperature near or a little above 0° C.

Air is preferably excluded from the mill as atmospheric air would render the grinding difficult, owing to moisture which may be present in the air being absorbed by the material being ground whereby the brittleness necessary for satisfactory grinding would be destroyed as the material would become more or less smeary through the absorption of moisture.

In the manner described it is possible to obtain a dry berry mass, ground to comparatively fine powder, and which may be stored several years. This lasting powder, easy to take and causing no unpleasantness, brings forth the full action of the curative substances and has given the very best results when used for curing the above mentioned diseases.

I claim:—

1. A method for converting berries of the mountain-ash into a lasting powder-state, consisting in drying the berries in the air, rasping the same, exposing them to a temperature of about 70 to 80° C., cooling the material rapidly to a temperature of about 0° C. and grinding the material in a mill cooled to about 0° C.

2. A method as claimed in claim 1, in which the grinding in the mill is carried out under exclusion of air.

In testimony whereof I affix my signature.

PAUL GRUBE.